United States Patent
Ball et al.

(12) 
(10) Patent No.: US 6,370,290 B1
(45) Date of Patent: Apr. 9, 2002

(54) INTEGRATED WAVELENGTH-SELECT TRANSMITTER

(75) Inventors: Gary A. Ball, Simsbury; Robert W. Ade, Bolton; Karl Kissa, Avon, all of CT (US); Paul Dunn, Westfield, MA (US); Timothy C. Munks, Crystal Lake, IL (US); Ronald T. Logan, Jr., Newton, PA (US), .; Eitan Gertel, North Wales, PA (US)

(73) Assignee: Uniphase Corporation, San Jose, CA (US)

( * ) Notice: Subject to any disclaimer, the term of this patent is extended or adjusted under 35 U.S.C. 154(b) by 0 days.

(21) Appl. No.: 08/934,189

(22) Filed: Sep. 19, 1997

(51) Int. Cl.⁷ .............................................. G02B 6/12
(52) U.S. Cl. ...................................................... 385/14
(58) Field of Search ............................... 385/11–15, 32, 385/88–90, 147

(56) References Cited

U.S. PATENT DOCUMENTS

| | | | |
|---|---|---|---|
| 4,284,663 A | | 8/1981 | Carruthers et al. |
| 4,773,075 A | | 9/1988 | Akiba et al. .................. 372/50 |
| 4,815,081 A | * | 3/1989 | Mahlein et al. ............... 372/32 |
| 4,913,525 A | * | 4/1990 | Asakura et al. ........ 350/162.12 |
| 4,953,939 A | | 9/1990 | Epworth et al. |

(List continued on next page.)

FOREIGN PATENT DOCUMENTS

| | | | |
|---|---|---|---|
| EP | 0 444 610 A2 | 3/1990 | |
| EP | 0 450 385 A1 | 3/1990 | |
| EP | 0 444 610 A2 | 4/1991 | |
| EP | 0 450 385 A1 | 9/1991 | |
| EP | 0 516 318 A2 * | 12/1992 | |
| EP | 0 516 318 A3 * | 12/1992 | |
| JP | 0 305 5709 | 2/1991 | |
| JP | 0-4274204 * | 9/1992 | .................. 385/88 |
| JP | 0 427 4204 A1 | 9/1992 | |

| | | | |
|---|---|---|---|
| WO | WO 97/05679 | * | 2/1997 |
| WO | WO 97/07577 | * | 2/1997 |
| WO | WO 98/50988 | * | 12/1998 |

OTHER PUBLICATIONS

"Properties of Loss–Coupled Distributed Feedback Laser Arrays for Wavelength Division Multiplexing Systems", by Stefan Hansmann, et al., *Journal of Lightwave Technology*, vol. 15, No. 7 (Jul. 1997).

"Single–Angled–Facet Laser Diode for Widely Tunable External Cavity Semiconductor Lasers with High Spectral Purity", by P.J.S. Heim, et al., *Electronics Letters*, vol. 33, No. 16 (Jul. 31, 1997).

"Monolithic Mode–Locked Semiconductor Laser for Continously Tunable Milimeter–Wave Transmission", by Dennis T.K. Tong, et al., *SPIE*, vol. 3038.

"2.5 Gbit/s Directly–Modulated Fibre Grating Laser for WDM Networks", by F.N. Timofeev, et al., *Electronics Letters*, vol. 33, No. 16 (Jul. 31, 1997).

"2.5 Gbit/s Directly–Modulated Fibre Grating Laser for Optical Networks", by F.N. Timofeev, et al., *The Institution of Electrical Engineers*, 1997.

(List continued on next page.)

*Primary Examiner*—Akm E. Ullah
(74) *Attorney, Agent, or Firm*—McCormick, Paulding & Huber LLP

(57) ABSTRACT

An integrated optical transmitter for use in an optical system has an optical head assembly with an optical beam generator for providing an optical beam and a lens assembly collecting the optical beam and generating therefrom a formed optical beam. Interface optics receives the formed optical beam and provides optical coupling so as to minimize insertion loss to the optical beam. Also included is an optical modulator for receiving the optical beam from the interface optics and for providing a modulated optical beam in response to received modulation signals. The optical modulator is coupled to the interface optics to be in a fixed relationship therewith.

24 Claims, 10 Drawing Sheets

U.S. PATENT DOCUMENTS

| | | | |
|---|---|---|---|
| 4,984,861 A | | 1/1991 | Suchoski, Jr. et al. |
| 5,011,247 A | | 4/1991 | Boudreau et al. .......... 350/96.2 |
| 5,018,820 A | * | 5/1991 | Boudreau et al. ............. 385/88 |
| 5,026,137 A | | 6/1991 | Tokumitsu |
| 5,068,864 A | * | 11/1991 | Javan ........................... 372/32 |
| 5,082,376 A | | 1/1992 | Beylat et al. ................... 385/3 |
| 5,107,360 A | | 4/1992 | Huber |
| 5,115,338 A | | 5/1992 | DiGiovanni et al. |
| 5,119,447 A | | 6/1992 | Trisno |
| 5,127,072 A | * | 6/1992 | Blauvelt et al. .............. 385/88 |
| 5,134,620 A | | 7/1992 | Huber |
| 5,140,456 A | | 8/1992 | Huber |
| 5,148,503 A | | 9/1992 | Skeie |
| 5,151,908 A | | 9/1992 | Huber |
| 5,153,762 A | | 10/1992 | Huber |
| 5,159,601 A | | 10/1992 | Huber |
| 5,166,821 A | | 11/1992 | Huber |
| 5,168,534 A | | 12/1992 | McBrien et al. |
| 5,187,760 A | | 2/1993 | Huber |
| 5,191,586 A | | 3/1993 | Huber |
| 5,200,964 A | | 4/1993 | Huber |
| 5,208,819 A | | 5/1993 | Huber |
| 5,210,631 A | * | 5/1993 | Huber et al. ................ 359/132 |
| 5,210,633 A | | 5/1993 | Trisno |
| 5,222,089 A | | 6/1993 | Huber |
| 5,231,529 A | | 7/1993 | Kaede |
| 5,243,609 A | | 9/1993 | Huber |
| 5,257,124 A | | 10/1993 | Glaab et al. |
| 5,257,125 A | | 10/1993 | Maeda |
| 5,260,823 A | | 11/1993 | Payne et al. |
| 5,268,910 A | | 12/1993 | Huber |
| 5,271,024 A | | 12/1993 | Huber |
| 5,283,686 A | | 2/1994 | Huber |
| 5,287,367 A | * | 2/1994 | Yanagawa .................... 372/31 |
| 5,299,212 A | * | 3/1994 | Koch et al. ................... 372/32 |
| 5,323,409 A | * | 6/1994 | Laskoskie et al. ............ 372/32 |
| 5,428,700 A | * | 6/1995 | Hall ............................. 372/32 |
| 5,544,183 A | * | 8/1996 | Takeda ......................... 372/38 |
| 5,579,143 A | | 11/1996 | Huber |
| 5,608,825 A | | 3/1997 | Ip |
| 5,627,848 A | | 5/1997 | Fermann et al. |
| 5,633,748 A | | 5/1997 | Perez et al. |
| 5,636,301 A | | 6/1997 | O'Sullivan et al. |
| 5,638,473 A | | 6/1997 | Byron |
| 5,642,448 A | | 6/1997 | Pan et al. ..................... 385/31 |
| 5,691,989 A | * | 11/1997 | Rakuljic et al. .............. 372/20 |
| 5,706,301 A | * | 1/1998 | Lagerstrom .................. 372/32 |
| 5,780,843 A | * | 7/1998 | Cliche et al. ............... 250/226 |
| 5,798,859 A | * | 8/1998 | Colbourne et al. ......... 359/247 |
| 5,825,792 A | * | 10/1998 | Villeneuve et al. ........... 372/32 |
| 5,867,513 A | * | 2/1999 | Sato ............................ 372/32 |

OTHER PUBLICATIONS

"Experimental Demonstration of an All–Optical Routing Node for Multihop Wavelength Routed Networks", by M. Shell, et al., *IEEE*, 1996.

"Continuously Chirped DFB Gratings by Specially Bent Waveguides for Tunable Lasers", by Hartmut Hillmer, et al., *Journal of Lightware Technology*, vol. 13, No. 9 (Sep. 1995).

"Optical Frequency Switching with SSG–DBR Structured Devices", by Hiroshi Yasaka, et al., *NTT Opto–Electronics Laboratories* (1995).

"Wavelength Tuning in Three Section Sampled Grating DBR Lasers", C.K. Gardiner, et al., *Electronics Letters*, vol. 31, No. 15 (Jul. 20, 1995).

"A 2.5–Gbit/s Return–to–Zero Integrated DBR Laser/Modulator Transmitter", by G. Raybon, et al., *IEEE Photonics Technology Letters*, vol. 6, No. 11 (Nov. 1994).

"Tunable Lasers for Photonics Integrated Circuits", by L.A. Coldren, et al., *CLEOS Summer Topical Meeting Integrated Optoeelctronics Proceedings of the CLEOS 1994 Summer Topical Meeting* (Jul. 6–8, 1994).

* cited by examiner

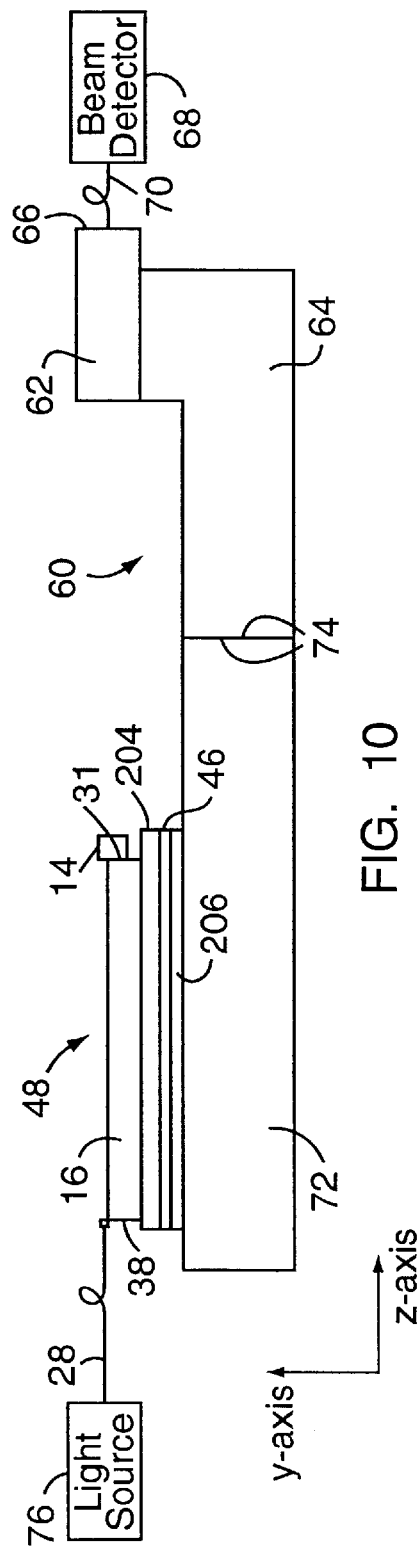
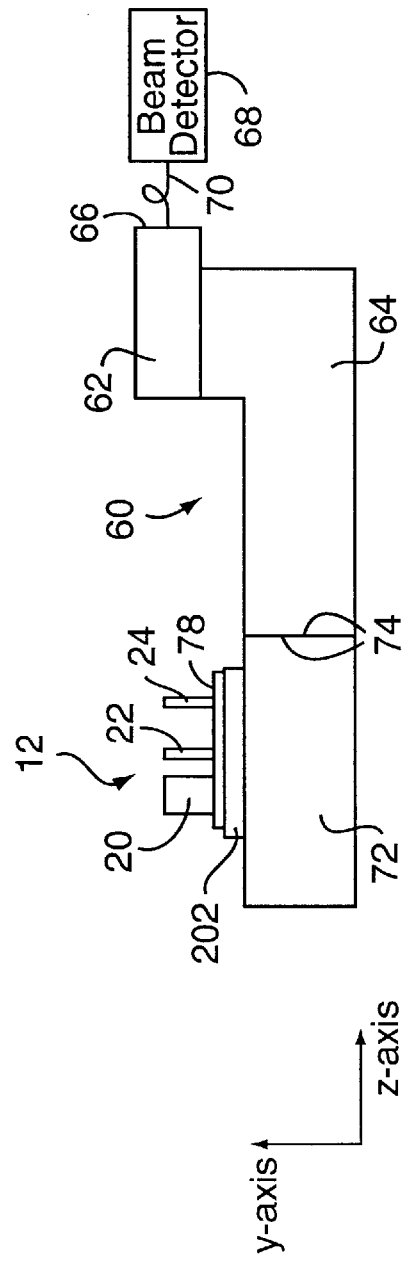
FIG. 10
FIG. 11

INTEGRATED WAVELENGTH-SELECT TRANSMITTER

FIELD OF THE INVENTION

This invention relates to optical transmitters, and more particularly to an optical transmitter that integrates a laser head, optical modulator, and possibly a wavelength reference, within a common package to reduce insertion loss, provide greater output power over a greater dynamic range, and reduce overall system cost.

CROSS REFERENCE TO RELATED APPLICATIONS

Some of the matter contained herein is disclosed and claimed in the commonly owned U.S. patent application Ser. No. 08/885,428, now U.S. Pat No. 5,982,964 entitled "Process For Fabrication And Independent Tuning Of Multiple Integrated Optical Directional Couplers On A Single Substrate"; U.S. patent application Ser. No. 08/885,449, now abandonded entitled "Method and Apparatus For Dynamically Equalizing Gain In An Optical Network"; U.S. patent application Ser. No. 08/885,427, now U.S Pat. No. 5,915,052 entitled "Loop Status Monitor For Determining The Amplitude Of Component Signals Of A Multi-Wavelength Optical Beam" and U.S. patent application Ser. No. 08/884,747, now U.S. Pat. No. 6,151,157 entitled "Dynamic Optical Amplifier" all of which are incorporated herein by reference.

BACKGROUND OF THE INVENTION

The low loss, light weight, small size, flexibility, and high intrinsic bandwidth of optical fiber make it a highly desirable medium for digital and analog signal transport. An optical transmitter generates a modulated optical signal which propagates through the optical fiber to a receiver end, wherein the optical beam is converted to an electrical signal. The optical beam may be modulated externally by an electrical signal representative of the information to be passed through the optical fiber.

Commercially available optical transmitters are made up of a plurality of discrete components interconnected by polarization-maintaining (PM) optical fiber. These components include a laser, an external optical modulator and control circuit modules. The packaging of a complete fiber-optic transmitter including these discrete components is relatively bulky and complicated. For example, currently available fiber optic transmitters produced for cable television (CATV) applications occupy a 19-inch rack drawer chassis, 3 inches or more high, housing power supplies, control circuits, laser, modulator, and amplifiers.

The potential military applications of RF and microwave fiber-optic transmitters are numerous. Possibly the largest military application is in the area of remotely mounted microwave antenna systems, such as phased-array antenna system designs, airborne radar warning-receiver direction-finding antenna systems, bi-static radar antenna systems, and many shipboard antenna systems. Practically any antenna system in which an RF or microwave signal is received or transmitted could benefit from direct microwave transport of the signal using fiber-optics between the antenna and the receiver/transmitter location. In most microwave antenna systems, a downconvertor/upconvertor system must be located in close proximity to the antenna aperture, due to the inefficiencies of metallic cables for transmission of microwave-frequency signals. The frequency converter electronics are therefore required to operate in the typically harsh environment of the antenna, which increases the size and cost of the front end packaging, and may limit the system desianer's flexibility in antenna placement on the platform. Also, the downconvertor typically requires that a local-oscillator reference signal be distributed to the front end area.

If a miniature external modulator transmitter module was available that could provide an essentially "transparent" microwave transport path over optical fiber, the frequency converter electronics could then be removed from the front end area, adjacent the antenna. This would not only reduce the size and complexity of the front end packaging, it would also improve overall system reliability, since fewer components would be located in the typically harsh front end environment. System performance also may actually be enhanced, since the frequency converter electronics typically limit the dynamic range of the downlink for most microwave systems. If the packaging and environmental constraints are relaxed on the downconvertor, enhanced dynamic range is more achievable.

An important application of the invention is telecommunications in which digital signals containing large volumes of voice, video, and data traffic are transmitted over optical fibers. At the higher data rates, the transmitter typically consists of a Distributed Feedback (DFB) laser and a modulator. Systems employing Dense Wavelength Division Multiplexing (DWDM) also typically contain a fiber coupler to tap off power and a wavelength reference, which is used in a feedback loop to stabilize the laser wavelength. The latter function is critical for DWDM where the optical signals from many transmitter are carried by a single optical fiber, yet can be separated from one another at the receive end because of the distinct wavelength used for each optical channel.

Currently, the optical transmitter's components are assembled from separate packages, namely a standard DFB laser diode package and modulator package, with possibly an optical tap coupler and wavelength reference in two other packages, that are all coupled to each other with optical fiber. Significant coupling losses are incurred at the laser-fiber and modulator-fiber interfaces, because lasers and modulators support elliptic modes while fiber medium supports a circular mode. Moreover, fiber pigtails on the laser and modulator input have to be realized in polarization maintaining fiber, which adds cost to the packaging because it has to be precisely rotated. Elimination of the optical fiber interconnects between the components not only reduces optical losses but reduces transmitter cost associated with splicing and storing the fiber within the transmitter.

Other commercially-available optical transmitters include a laser assembly fixedly coupled to an optical modulator which are then rigidly mounted to a support bed. The purpose of fixedly coupling of the optical components is to insure precise alignment to thereby reduce the power loss resulting from misaligned optics. Alignment of the optical components of these transmitters is difficult and time-consuming which thereby, increase the costs of manufacturing.

In addition, these optical transmitters are sensitive to thermal changes as a result of the different coefficients of thermal expansion for the optical components. As the ambient temperature of the transmitter increases or decreases the varying amounts of thermal expansion of the components stresses the components, possibly altering their optical characteristics. The different coefficients of thermal expansion also may alter the alignment of the optical components and thereby negatively affect the optical beam emitted from the laser assembly. This is especially critical because the optical beam emitted from a laser diode is directly focused to the modulator. Any shift of the optical components greatly reduces the output power of the transmitter as a result of the misalignment of the components. Some prior art devices such as those marketed by the G.E.C. Marconi company are comprised of discrete components and include a thermocooler to help maintain temperature stability. However, these devices are not free from the aforementioned problems.

Furthermore the optical components are not replaceable or interchangeable because the components are mounted rigidly to each other and the support bed. If a component has failed or the wavelength of the optical beam wishes to be changed, the component cannot be easily removed or replaced without damage to the transmitter.

Accordingly, it is a principal object of this invention to provide an integrated optical transmitter that reduces insertion loss, provides greater output power over a greater dynamic range, and reduces cost related to assembly and interconnection of optical components.

It is another object of this invention to provide an integrated optical transmitter included within a single unit or housing.

It is a further object of this invention to provide a pre-aligned optical sub-assembly, which can be compliantly mounted to an optical bed, and which also has a surface to which a modulator can be fixedly secured.

It is a further object of this invention to provide an integrated optical transmitter that reduces misalignment due to varying coefficients of thermal expansion of the optical components.

It is yet another object of this invention to provide an integrated optical transmitter of the foregoing type having integrated wavelength control.

It is yet another function of this invention to provide an integrated optical transmitter wherein the optical components are interchangeable.

SUMMARY OF THE INVENTION

According to a preferred embodiment of the present invention, an integrated optical transmitter for use in an optical system includes an optical head assembly having an optical beam generator for providing an optical beam and a lens assembly collecting the optical beam and generating therefrom a formed optical beam. Also included is an optical modulator for receiving the formed optical beam for providing a modulated optical beam in response to received modulation signals. Interface optics are provided to receive the formed optical beam and to present the formed optical beam to the optical modulator. The interface optics provide optical coupling with the optical modulator to minimize insertion loss to the formed optical beam and to maintain a fixed optical relationship therewith According to another aspect of the present invention, a method of fabricating an integrated optical transmitter includes the steps of:
(a) aligning optically a laser diode and an aspheric lens;
(b) securing the laser diode and the aspheric lens to a mounting element to define a laser head assembly;
(c) securing fixedly a focusing lens to the laser head assembly in optical alignment with the laser diode and aspheric lens;
(d) compliantly securing the laser head subassembly to an optical bed.

(e) securing fixedly an optical modulator to the focusing lens in optical alignment with the focusing lens.

According to yet another aspect of the present invention, a method of fabricating an integrated optical transmitter of the foregoing type also includes the step of controlling wavelength select control by means of a wavelength filter, such as a Fabry-Perot etalon, fiber Bragg grating, Michelson interferometer, or etalon with multi-layer dielectric films, which samples the light in the transmitter, and is included within a housing.

The above and other objects and advantages of this invention will become more readily apparent when the following description is read in conjunction with the accompanying drawings.

BRIEF DESCRIPTION OF THE DRAWINGS

FIG. 10 is a side elevational view of a GRIN lens/ modulator assembly and test jig for aligning the optics of the GRIN lens/ modulator assembly of the optical transmitter of FIG. 6.

FIG. 11 is a side elevational view of a laser head assembly and test jig for aligning the optics of the laser head assembly of the optical transmitter of FIG. 6.

DETAILED DESCRIPTION OF THE PREFERRED EMBODIMENT

An integrated optical transmitter provided in accordance with the present invention is generally characterized by an optical head assembly for generating an optical beam and an optical modulator which receives the optical beam and provides modulation thereto in response to modulation signals. These two components are joined by interface optics, typically a GRIN lens. The present transmitter is configured so that the optical head assembly is maintained in fixed optical communication with the optical modulator regardless of the embodiment. As detailed hereinafter, the several embodiments maintain this fixed relationship in a variety of ways, including an epoxy bond between the components and a spaced relationship with a collimated beam.

Figure 1:
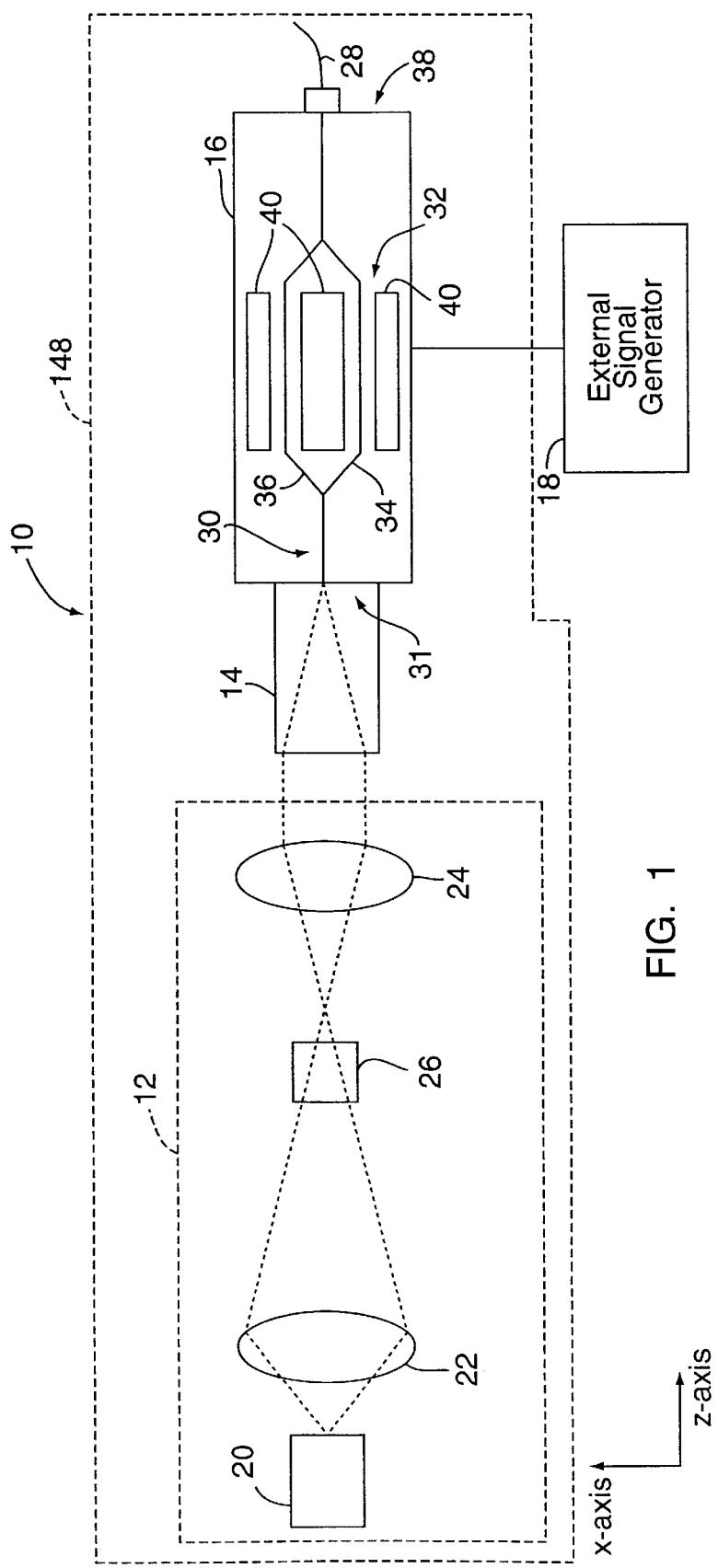
FIG. 1 is a diagrammatic block diagram of an integrated optical transmitter of the type embodying the present invention.

FIG. 1 illustrates an integrated optical transmitter, generally designated 10, embodying the present invention for generating a modulated optical beam having a predetermined wavelength of light. The optical transmitter 10 is a preferred embodiment and includes a laser head assembly 12 that generates a polarized optical beam of a known wavelength of light. The laser head assembly 12 provides an optical beam via a Graded Index (GRIN) lens 14 which is coupled directly to an optical modulator 16. An external signal generator 18 provides a Telecommunications (Telecom) or Cable-Television (CATV) communications signal to the modulator 16 which impresses the signal onto the optical beam.

As shown in FIG. 1, the laser head assembly 12 comprises a laser diode 20 for generating an optical beam of a known light wavelength, and a pair of aspherical optical lenses 22,24 for focusing and collimating the optical beam. The first aspheric lens 22 collects and focuses the light, creating a magnified image of the source at its back focal plane. The second aspheric lens 24 collimates the light, i.e., converts diverging light rays to parallel. An optical isolator 26 is disposed between the two lenses 22,24 to prevent any light reflected at some point further down the optical link from propagating back to the laser diode 20. For example, any light reflected by connectors or splices in the communication link will propagate down the optical fiber 28 back to the laser diode 20. The reflected power is absorbed or diverted by the optical isolator 26. It should be noted that the isolator can be placed at other points in the optical system, for example, between the second lens 24 and GRIN lens 14. The position in the preferred embodiment allows the isolator to be of small diameter. Also note that other types of lenses are possible, such as spherical. The aspheric lenses are chosen because of their ability to collect the widely divergent light from laser diodes, and focus and collimate it, with a minimum of aberration and lost optical power.

The collimated light from the second lens 24 is directed to the GRIN lens 14, which focuses the light to a small enough spot size, and low enough divergence in order to permit efficient coupling of light into an optical waveguide 30 of the optical modulator 16. The GRIN lens may be rigidly attached to the laser head assembly The modulator modulates the light in response to an electrical signal, such as the communications signal, provided by the external signal generator 18.

The two aspheric lenses 22,24 provide flexibility regarding the type of laser diode 20 used in the system. For example, the two lens system allows for the use of a laser diode mounted in its own hermetic housing, e.g. a "TO-5.6 can," which is convenient to handle, and protects the laser diode from any adverse contaminants in the atmosphere. Coupling between the laser diode 20 and modulator 16 is generally inefficient if only one lens 24 is used, because the divergence of the laser beam at the output of commercially available lasers in TO-5.6 cans is too great. The collimated beam provided by a single lens 24 may be much larger than the beam size that can be accepted by the GRIN lens 14. Focusing the beam with the first lens 22 and using a second lens 24 to collimate the beam allows the beam size to be optimized for the GRIN lens 14, in spite of limitations imposed by the TO-5.6 can. It should be recognized, however, that a single aspheric lens 24 may be used to collimate the optical beam, provided the laser diode 20 generates a beam that, when collimated, can be accepted by the GRIN lens 14.

Other variations of the preferred embodiment are possible if changes in optical power through the system caused by the thermal expansions are of greater detriment than power loss by "de-tuning" the optical train somewhere in order to reduce sensitivity to angular alignment at the expense of power loss. For example, by using a GRIN lens slightly shorter than is normally used for lowest power loss, a larger than normal optical beam is presented by the GRIN lens to waveguide 30. Angular misalignment causes the position of the beam at the end of the GRIN lens to move along the X and/or Y axes, however, the beam is more likely to fill the waveguide with light, due to its larger size. Hence, the misalignment sensitivity is lowered, though, the total power coupled into the waveguide 30 is reduced relative to the case when the GRIN lens provides a beam better matched to the beam size naturally accepted by waveguide 30. The waveguide can also be modified to accept a larger beam from the GRIN lens, resulting in even further reductions in alignment sensitivity. However, some penalty in power loss is likely when using the shortened GRIN lens due to aberrations in the optical properties of the beam which is presented to waveguide 30. These methods of reducing sensitivity to misalignment can be applied to the previous embodiments, as well. They can be used to reduce the sensitivity to X, Y or Z misalignment of the GRIN lens with waveguide 30, in the preferred embodiment. Other variations of the preferred embodiment exist which reduce sensitivity to one kind of translation or rotational misalignment at the expense of increased sensitivity to some other translation or rotational misalignment, or at the expense of increased power loss. In general, where ever the beam is collimated or nearly so, the X, Y and Z sensitivities are reduced at the expense of greater rotational sensitivity. On the other hand, in places where the beam is focusing or expanding, the rotational sensitivities are reduced at the expense or greater X, Y and Z sensitivity.

The modulator 16 is an integrated optical circuit (IOC) fabricated in lithium niobate ($LiNbO_3$). The modulator includes a waveguide 30 at the receiving end 31 of the modulator that directs the optical beam to a Mach-Zehnder Interferometer (MZI) 32. As the optical beam enters the interferometer 32, the beam is split and propagates into two parallel paths or arms 34,36 which are then recombined at the transmitting end 38 of the modulator. The interferometer 32 includes a plurality of electrodes 40 disposed on both sides of the arms 34,36. The applied voltage from the communications signal to the electrodes controls the velocity of light passing through each arm of the interferometer, via the electro-optic effect in lithium niobate. Depending on the applied voltage, the light in each arm 34,36 of the interferometer 32 can be made to constructively or destructively interfere when the two beams are recombined at the transmitting end 38, which makes high speed switching possible. In this manner, the communications signal provided by the external signal generator is impressed onto the beam of light.

Typically, the interferometer 32 is set to be midway between constructive and destructive interference when no signal voltage is applied, by introducing $\lambda/2$ phase difference between the two light beams in the arms 34,36 of the interferometer. The signal voltage applied to the electrodes 40 causes the light in the arms of the interferometer to either completely constructively interfere ("on" state), or destructively interfere ("off" state). The phase difference between the light beams in the two arms of the interferometer, with no signal applied, is referred to as the bias point of the interferometer.

Assembly and alignment of the optical components of the transmitter 10 are critical to overcome concerns associated with prior art optical transmitters. In the prior art, the optical components of the transmitter are mounted fixedly to each other and to a common platform or bed. This method of coupling each of the optical components raises concerns associated with the different coefficients of thermal expansion of each optical component. The varying thermal expansion stresses the components when heated or cooled which results in misalignment of the components and possible altering of their optical characteristics. The modulator 16 is particularly sensitive to these resulting stresses because the interferometer 32 of the modulator is formed of lithium niobate. Lithium niobate is a piezoelectric material and therefore, any stresses to the modulator substrate can cause the bias point to change from its optimum setting. Hence, mounting the modulator 16 with a compliant adhesive prevents stresses or deflections in the package from being transferred to the modulator.

Figure 2:
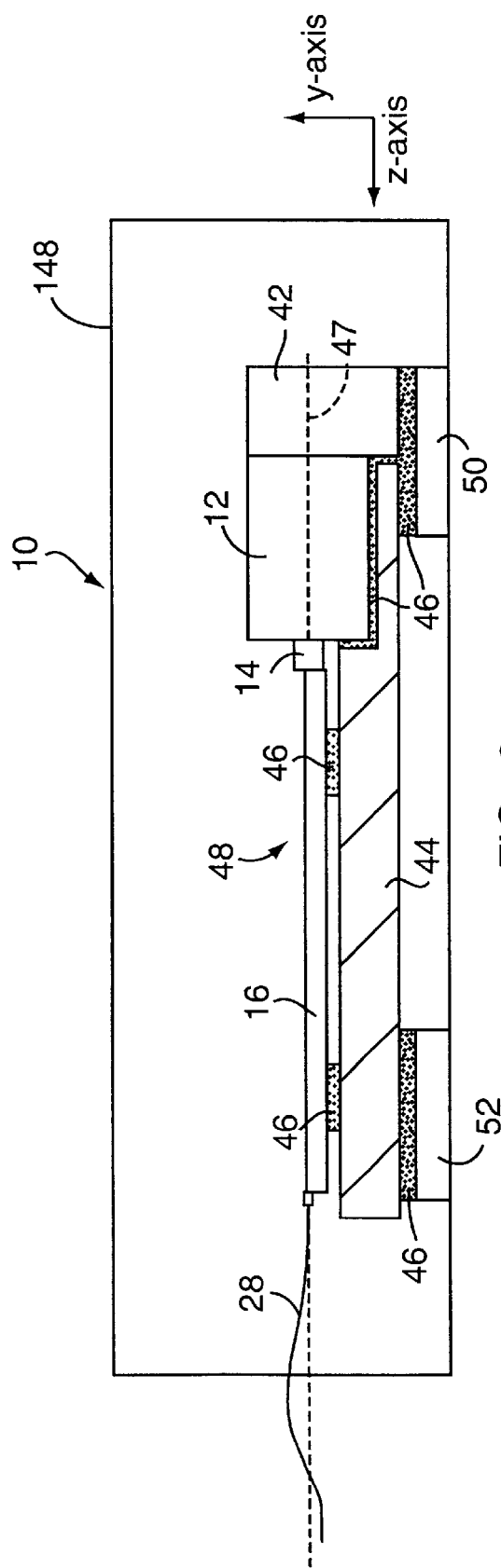
FIG. 2 is a side elevational view of an integrated optical transmitter of FIG. 1.

FIG. 2 illustrates the mechanical assembly of the optical transmitter 10 of a type embodying the present invention that overcomes the effect of varying coefficient of thermal expansion of the components. These optical components are rigidly secured to each other to provide the laser head assembly 12 with the GRIN lens wherein the components are fixed in optical relationship to one another. The laser head assembly 12 with the GRIN lens is then mounted to an upper surface of a common substrate or optical bed 44 by a complaint adhesive 46, such as RTV, Ecosorb and "Ablestick". The laser head assembly 12 is mounted on a recessed stepped portion of the optical bed 44 at one end in order that the optical beam generated at the focal point of the GRIN lens 14 aligns with input facet 31 of waveguide 30 (see FIG. 1), which is located at the upper surface of the modulator substrate 16. The bottom of the modulator is also secured to the optical bed 44 with the complaint adhesive 46.

The compliant adhesive 46 isolates each of the optical components 12, 14 and 16 from the effects of thermal expansion. The compliant adhesive permits the subassembly to remain optically-fixed without regard to temperature change of the transmitter 10. The use of compliant adhesive minimizes the stress of both modulator 16 and laser head assembly 12 as these components thermally expand and contract during manufacture or operation. Stresses are not only deleterious to optical alignment because of small deflections that occur at critical points in the optical train, but stresses can also affect the bias point of the Mach-Zehnder modulator 16.

To further reduce misalignment of and stresses to the optical components due to the effects of thermal expansion, thermal control of laser head assembly 12 and modulator 16 is also provided. A thermal transfer plug 42 is coupled to a rear portion of the laser head assembly 12 to transfer heat from the laser directly to a thermoelectric cooler (TEC) 50. A second TEC 52 is coupled by the compliant adhesive 46 to the optical bed 44. The TECs 50,52 remove or add heat from the modulator 16 and laser head assembly 12, in order to maintain optimum temperature of the laser during operation. A thermistor (not shown) mounted in the thermal transfer plug 42 monitors the temperature of the laser head assembly 12. The optical bench 44 also helps to minimize thermal gradients across the modulator 16 which can create internal stresses that affect its bias point.

Figure 3:
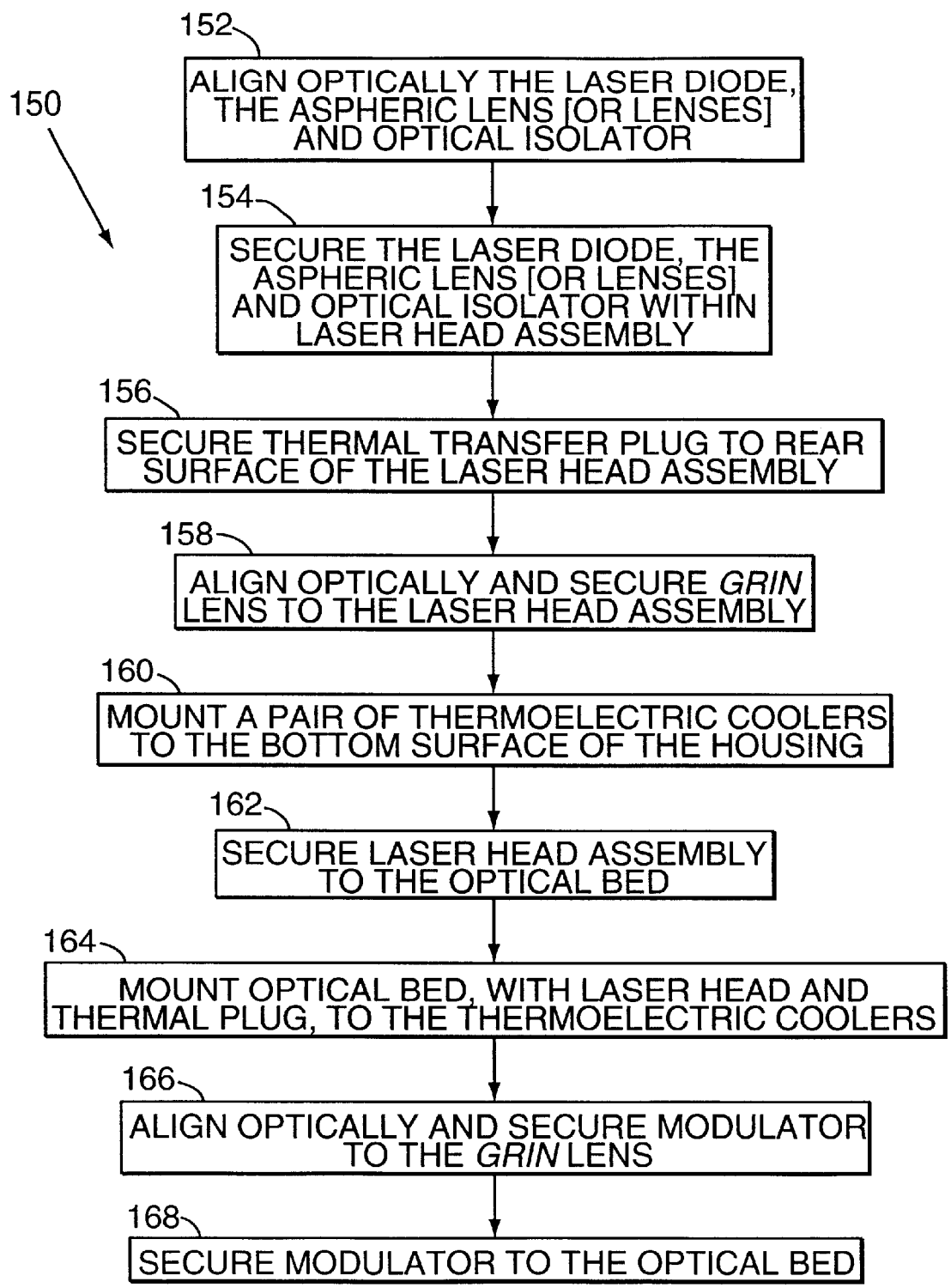
FIG. 3 is a diagrammatic illustration of a fabrication process for the modulator of FIG. 1.

A method 150 of fabricating the optical transmitter 10 of FIG. 2 is shown in blocks 152–166 of the functional diagram of FIG. 3. As shown in blocks 152–156, the laser diode 20, aspheric lenses 22,24 and optical isolator 26 are aligned to provide a collimated beam at its output having output power within a predetermined level. These components are then secured within the laser head assembly 12. The thermal transfer plug is then secured to the rear surface of the laser head assembly. In block 158, the GRIN lens 14 is first aligned and then secured to the laser head assembly 12. A pair of TECs 50,52 are mounted to lower inside surfaces of the housing 148. As shown in block 162, the laser head assembly is secured to the optical bed 44, which is then mounted to the thermoelectric coolers in block 164. In block 166, the modulator 16 is aligned and secured to GRIN lens 14 by epoxy such that the focal point of the lens is positioned at the input facet 31 of the waveguide 30 of the modulator. In block 168, the modulator is secured to the optical bed 44.

Figure 4:
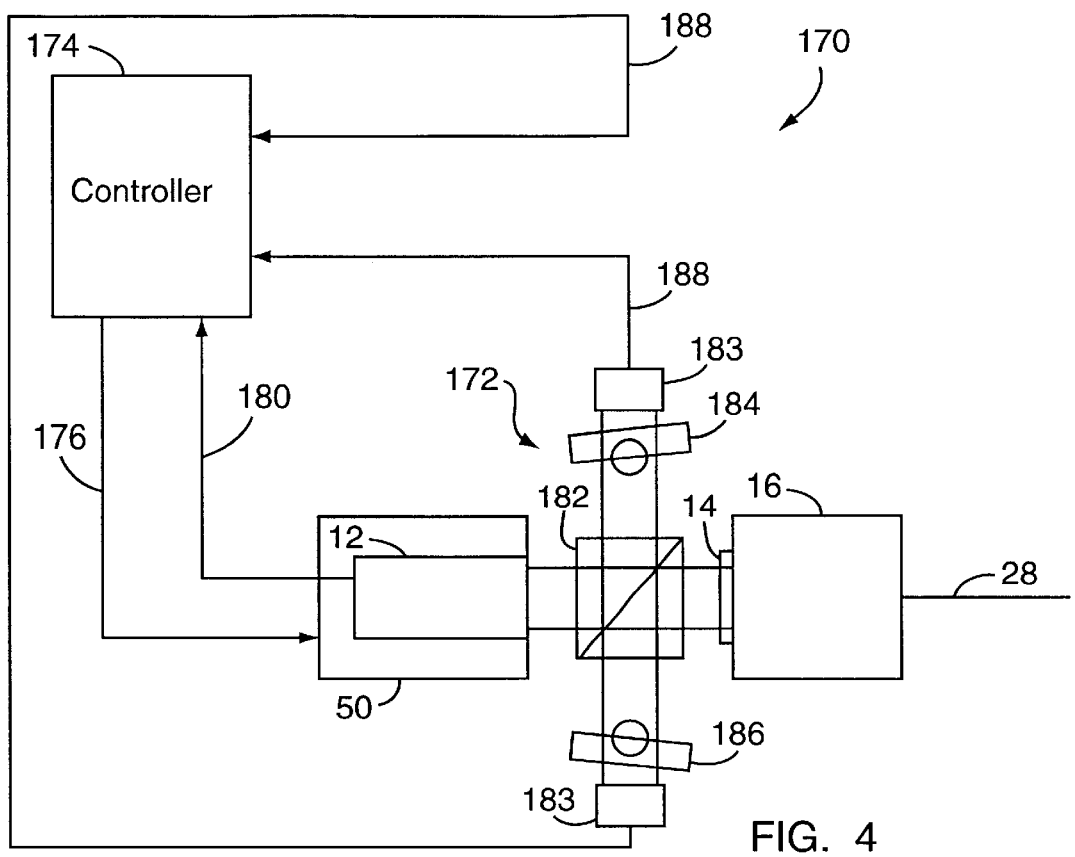
FIG. 4 is a simplified schematic illustration of an alternative embodiment of the integrated optical transmitter of FIG. 2 including a means for stabilizing the wavelength of the optical beam.

In an alternative embodiment 170 of the present invention shown in FIG. 4, the optical transmitter 170 includes a means 172 for stabilizing the wavelength of the optical beam. The wavelength of light generated by the laser diode 20 is dependent upon its temperature and current. A method of stabilizing the output wavelength of the optical beam is to control the temperature of the laser head assembly 12 using a thermoelectric cooler (TEC) 50 that is thermally-connected to the laser head assembly. A controller 174 provides a temperature control signal at 176 to the TEC 50 for adjusting the temperature of the laser diode 20 in response to a feedback signals at 188,188 representative of the wavelength of the optical beam and a signal at 180 representative of the temperature of the laser. In this manner, the wavelength of the optical beam may be stabilized or locked at a predetermined wavelength. Typically, laser temperature tuning of 10° C. or less is more than adequate to compensate for laser aging effects which influence wavelength during the lifetime of the transmitter, therefore, alignment of the optical train, and modulator optical properties, are not adversely affected by thermal expansion/contraction that accompanies the temperature change introduced by the wavelength stabilization.

The optical system 170, as described above, used to efficiently couple light from the laser head assembly 20 to the GRIN lens 14 and then modulator 16 is designed to produce a collimated beam after the second aspheric lens 24 (see FIG. 1). Because the beam is well behaved in this section of the optical train, it is an ideal place to sample the beam for the purpose of locking the wavelength.

The optical beam, therefore, is sampled by placing a beam splitter 182 between the second aspheric lens 24 and the GRIN lens 14. Approximately 1% of the light from the laser diode 20 is reflected out of the path between the laser head assembly 12 and the GRIN lens 14 and modulator 16. This light is then directed into a pair of filtered detectors 183,183, such as photodiodes. The detectors' spectral response is highly influenced by a pair of angle-tuned narrow bandpass filters 184,186 disposed in front of the filtered detectors. The narrow bandpass filters 184,186 are rotated to change the incidence angle and thus the center transmission wavelength, which is a function of incidence angle.

The output signals at 188,188 of the filtered detectors 183,183 are provided to the controller 174, which generates an output signal representative of the wavelength of the optical beam at 176. The temperature of the laser head subassembly 12 is monitored with a thermistor which is mounted within the thermal transfer plug 42 (see FIG. 2).

Figure 5:
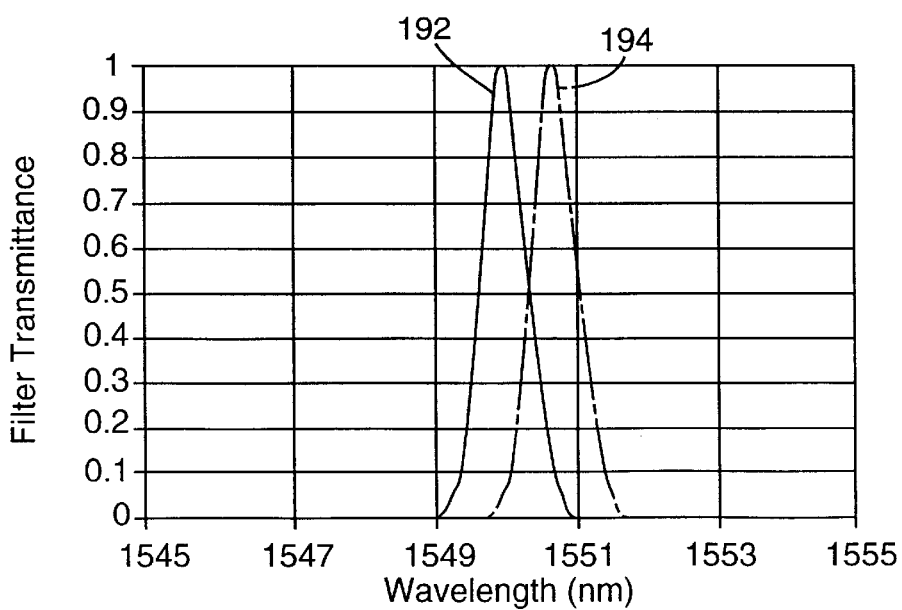
FIG. 5 is a plot of the output transmittance of a pair of filtered detectors.

To angle tune the narrow bandpass filter 184,186, the filters are rotated to overlap the transmission spectra in a manner shown in FIG. 5 once the temperature and emission wavelength is set to the predetermined values. Curve 192 represents the spectral response of filter 184 and curve 194 represents the spectral response of filter 186, the filters 184,186 are first tuned to find the peak transmittance by monitoring the output from the detectors 183,183. The bandpass filters 184,186 are then rotated such that the output from the detectors 183,183 are approximately 0.5 of the peak value. Since the transmittance of the filters 184,186 is close to symmetric, the filter will need to be tuned in the right direction. This direction is known from the center wavelength relationship with incidence angle. The filters are then locked into place by laser welding which strongly couples the response from the filtered detectors 183,183 to the input wavelength.

In the operation of the wavelength stabilizer 172, the output from the filtered detectors 183,183 will change as the emission wavelength of the laser diode 20 changes. If, for instance, the wavelength increases, the output from one filtered detector 183 will decrease and the output from the other filtered detector 183 will increase. By measuring the ratio of the output from the two filtered detectors 183,183 20 determined by the controller 174, the emission wavelength can be monitored. By using this ratio, a relative signal at 176 generated by the controller 174 can be used to change the wavelength of the laser diode 20 by changing the laser current or the voltage to the thermoelectric cooler 50.

Figure 6:
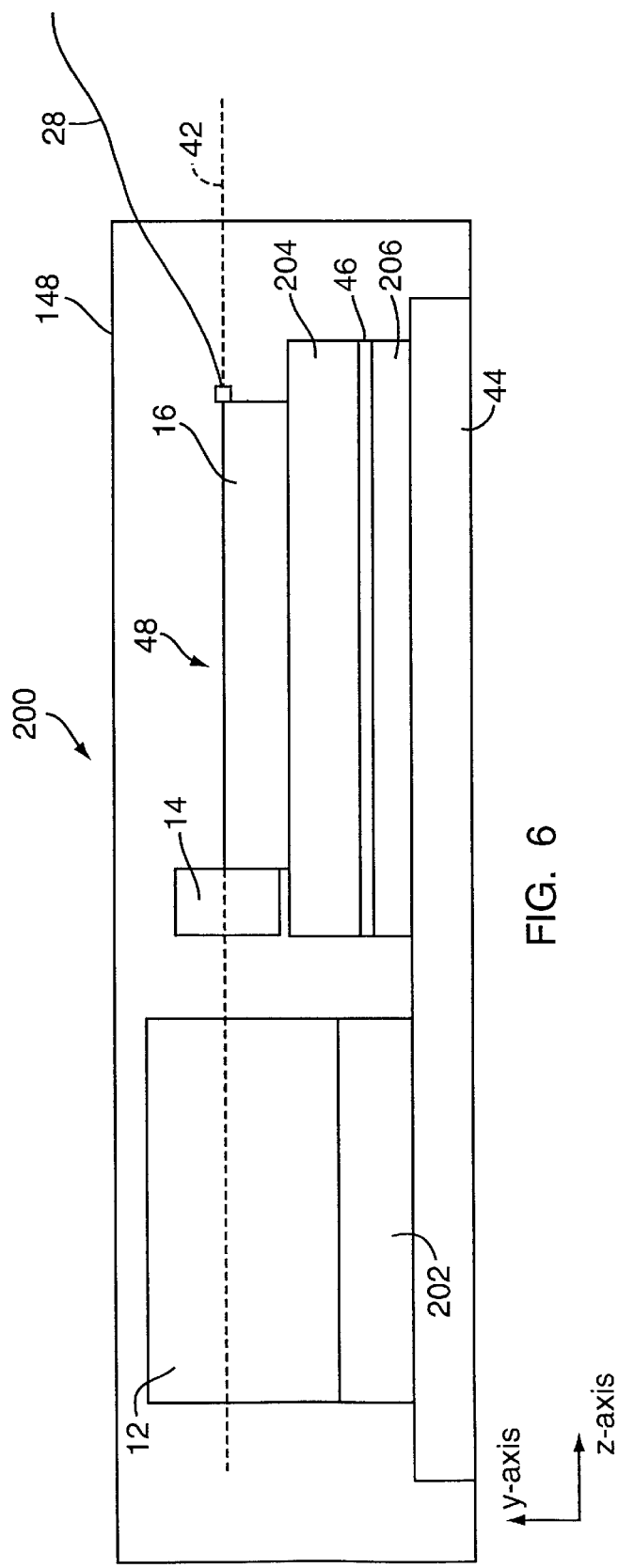
FIG. 6 is a side elevational view of a second alternative embodiment of an integrated optical transmitter embodying the present invention.

In another embodiment 200 of the present invention shown in FIG. 6, the optical transmitter 200 includes a laser head assembly 12 and a GRIN lens/modulator assembly 48 mounted to a common optical bed 44 which is secured within a housing 148. The optical assemblies are fixed in optical relationship to each other wherein the optical axis 42 propagates along the z-axis. The laser head assembly 12 is fixed directly to a carrier plate 202 which is secured to the optical bed 44. The GRIN lens/modulator assembly 48 are secured to a mounting block 204 composed of the same material, lithium niobate, as the modulator in order to reduce the effects of thermal expansion. The under surface of the mounting block 204 is secured to an upper surface of a second carrier plate 206 by a compliant adhesive 46. The GRIN lens 14 and laser head assembly 12 are laterally-spaced on the optical bed 44 to align optically, but are not coupled together. This permits these optical components to expand and contract independently and thus, minimizes the stresses associated with the thermal expansion of the optical components. Moreover, the integrated optical transmitter of FIG. 6 is capable of assembly in distinct steps which may be separate in time and location.

In the embodiment of FIG. 6, the laser head assembly 12 remains fixed relative to the optical bed 44. On the other hand, the compliant adhesive 46 permits the modulator to move orthogonally in the x-axis, y-axis and z-axis to minimize stress on the modulator 16 as the components thermally expand and contract during manufacture or operation. This movement eliminates stress to the modulator which can affect the bias point of the Mach-Zehnder modulator 16.

One might expect that the independent movement of the GRIN lens/modulator assembly 48 will dramatically effect the power output and optical characteristic of the optical beam. This is true of an optical transmitter wherein the optical beam generated by the laser diode is directly focused to the input facet of the modulator without having a portion of the beam collimated. Any movement or misalignment of the focused beam increases the power loss of the transmitter. It has been determined, however, that use of a collimated beam between the laser head assembly 12 and the GRIN lens 14 reduces the sensitivity of power loss to misalignment in the orthogonal directions (X, Y and Z). The optical transmitter 200 of FIG. 6, therefore, collimates the portion of the beam that propagates between laser head assembly 12 and GRIN lens 14, to reduce power loss as a result of misalignment or movement of the components in the orthogonal axes. This feature permits the laser head assembly 12 and GRIN lens 14 to effectively "float" independently with reduced effect to the output power of the beam, if the motion of the GRIN lens relative to laser head assembly can be constrained to be only in the X, Y or Z direction.

Figure 7:
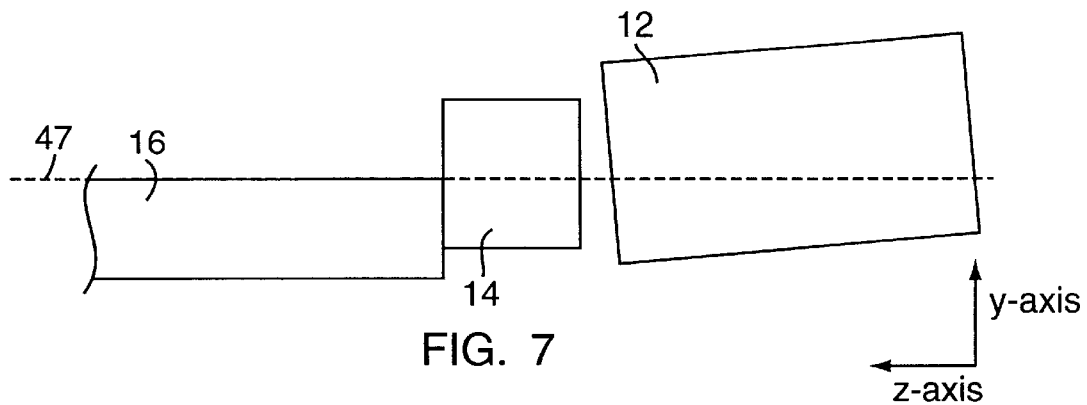
FIG. 7 is a expanded side elevational view of a portion of the optical transmitter of FIG. 6 wherein a laser head assembly is tilted about the X-axis.
Figure 8:
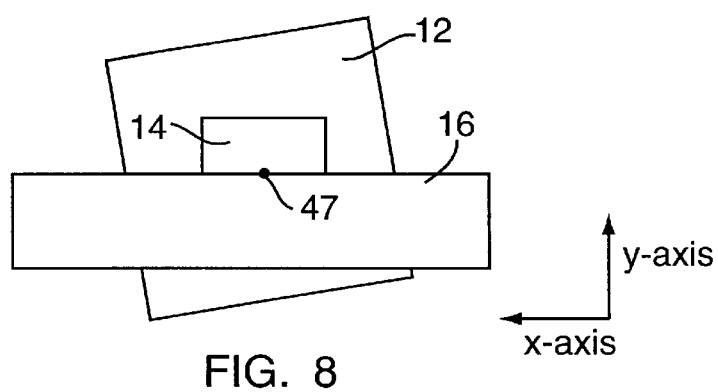
FIG. 8 is a expanded front elevational view of a portion of the optical transmitter of FIG. 6 wherein a laser head assembly is tilted about the Z-axis.
Figure 9:
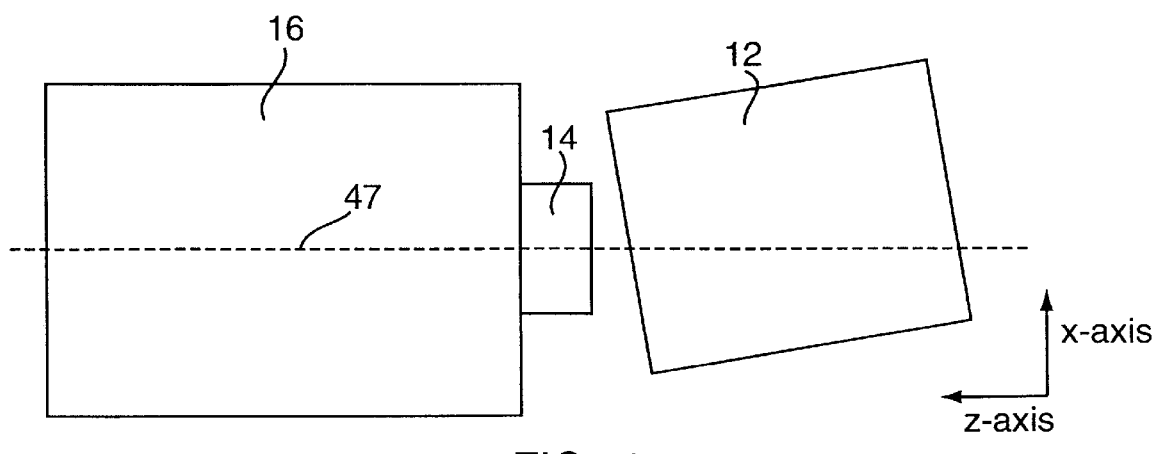
FIG. 9 is a expanded top plan view of a portion of the optical transmitter of FIG. 6 wherein a laser head assembly is tilted about the Y-axis.

The tradeoff of desensitizing the optical beam to changes in the optical alignment in the orthogonal planes is that the optical beam is sensitive to angular misalignment, such as pitch (rotation about the X-axis, shown in FIG. 7), roll (longitudinal rotation about the Z-axis, shown in FIG. 8), and yaw (horizontal rotation in about Y-axis, shown in FIG. 9) of any of the components. Measurements made with typical optical components indicate that the compliant adhesive must constrain pitch or yaw tilt of the GRIN lens/modulator assembly relative to the laser head assembly to within approximately 0.01° degree in order that power output from the modulator is not reduced significantly. Likewise, the X and Y position of the modulator, relative to the laser head, must still be maintained to within approximately ±20 µm for the same reason. These tolerances must be held over the lifetime of the device (typically 20 years or more for telecommunications applications), even after exposure to storage temperatures ranging −40 to 85°. Any shrinkage of the compliant adhesive during assembly, such as from curing, must not cause movement of the modulator assembly to exceed these tolerances, or must be compensated for by offsetting the modulator position prior to adhesive cure, or by X, Y, pitch, or yaw offsets during final assembly with the laser head. Note that the preferred embodiment does not suffer from these severe requirements of the compliant adhesive because the optical train is a single rigid unit. FIGS. 7–9 illustrate pitch, roll and yaw, respectively, of the laser head assembly 12 relative to the optical axis 47.

The collimating of the optical beam to propagate the beam from the laser head assembly 12 to the GRIN lens 14 and modulator 16 also permits independent assembly and alignment of the optics of the laser head assembly and the combined GRIN lens/modulator assembly 48. This method allows each assembly 12,48 to be fabricated at different locations which can then be brought together and easily aligned to fabricate the transmitter 200. The modularization of the transmitter also allows any laser head assembly 12 to be easily combined or interchanged with any GRIN lens/modulator assembly 48, and replacement of either assembly to repair the transmitter or change the wavelength of its optical beam. In addition, the laser can be temperature tuned independent of the GRIN lens/modulator assembly.

To ensure alignment of the optics of each assembly 12,48, the method of fabricating and aligning of the assemblies includes a test jig 60 (see FIGS. 10 and 11) having a GRIN lens 62 mounted to an upper surface of a common test bed 64 for receiving an optical beam emitted from the assemblies being fabricated. The transmitting end 66 of the lens 62 is optically connected to a beam detector 68 by an optical fiber 70. The beam detector measures the output power of the optical beam to provide feedback during the alignment procedure of the optical components of each assembly.

The test bed 64 of the jig 60 and a vacuum chuck 72 for mounting each of the assemblies 12,48 include a precision ground engagement surface 74,74 for maintaining the vacuum chuck and test bed at a precise known position in the x, y plane relative to each other. This permits the laser head assemblies 12 and the GRIN lens/modulator assemblies 48 to be independently manufactured and require minimal alignment when assembled together to form the transmitter 200.

Figure 12:
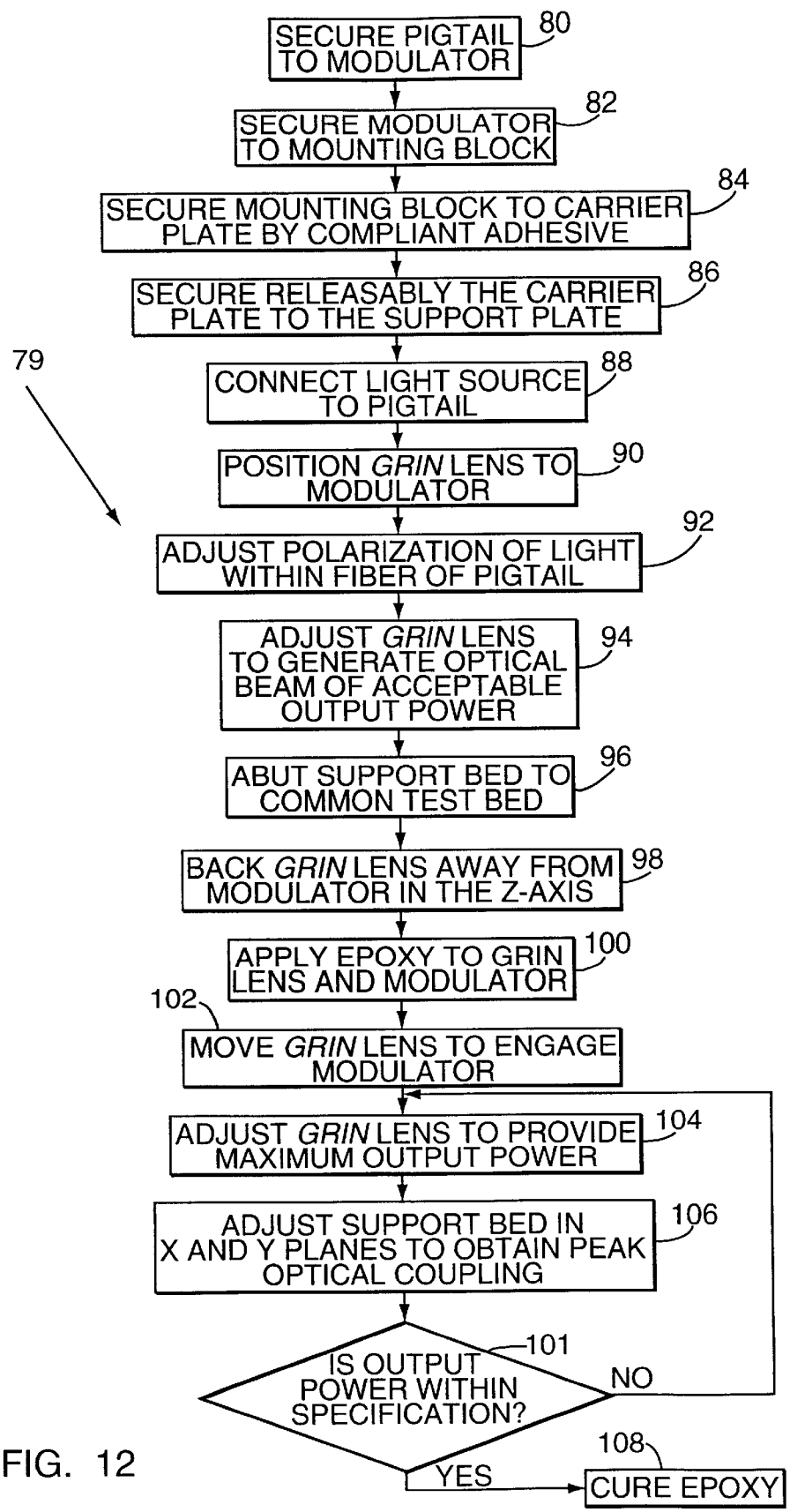
FIG. 12 is functional diagrams of a preferred general sequence of steps for fabricating and aligning the GRIN lens/modulator assembly of FIG. 6.

A method 79 of fabricating the GRIN lens/modulator assembly 48 and aligning of its components of the embodiment of FIG. 6 is shown in blocks 80–108 of the functional diagram of FIG. 12. Referring to block 80 and FIG. 10, the fiber-optic pigtail 28 is secured to the transmitting end 38 of the modulator 16. In blocks 82–86, the modulator is secured fixedly to the mounting block 204. The mounting block is then mounted to the upper surface of the carrier plate 206 by the compliant adhesive 46 at a predetermined position and orientation. The carrier plate 206 is then releasably secured to the vacuum chuck 72 at a known position. Referring to blocks 88–90, a light source 76 is connected to the pigtail 28 of the modulator 16 to emit an optical beam from the receiving end 31 of the modulator. The GRIN lens 14, using a vacuum chuck, is positioned at the receiving end 31 of the waveguide portion 30 of the modulator 16 using a vacuum chuck. In block 92, the polarization within the fiber of the pigtail 28 is adjusted to provide the maximum output and provide rough collimation of the optical beam. Referring to block 94, the GRIN lens is positioned so that the output power of the optical beam from the GRIN lens is at an acceptable value.

Referring to block 96, the vacuum chuck 72 is then abutted to the engagement surface 74 of the common test bed 64. In blocks 98–102, epoxy is applied to the GRIN lens modulator interface. The GRIN lens 14 is adjusted to provide peak output power measured by the beam detector 68 in block 104. Optimization of the optics insures that the beam is propagating along the z-axis with minimal pitch and yaw, but not necessarily the optical alignment in the X and Y planes.

Referring to blocks 106 and 101, the vacuum chuck 72 is then adjusted in the X and Y planes with respect to the engagement surface 74 of the common test bed 64 to obtain peak optical coupling. The alignment of GRIN lens 14 and vacuum chuck 72 may need to be done recursively or simultaneously until output power is within specification. When the output power is within specification, the epoxy is first cured using ultra-violet light and then oven cured (block 108).

Figure 13:
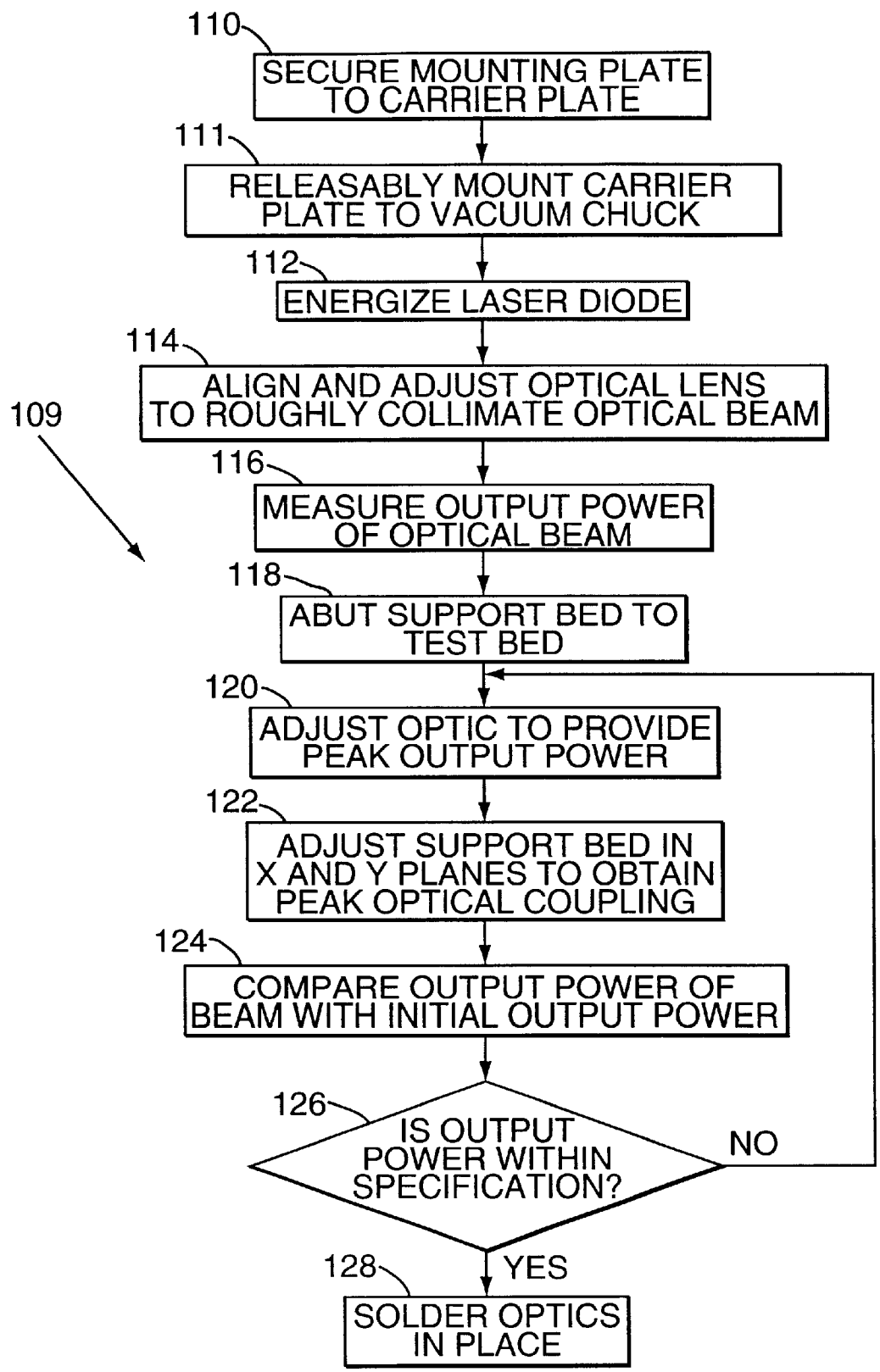
FIG. 13 is functional diagrams of a preferred general sequence of steps for fabricating and aligning the laser head assembly of FIG. 6.

A method 109 of fabricating the laser head assembly 12 and aligning of the optical components is shown in blocks 110–128 of the functional diagram of FIG. 13. Referring to blocks 110–111 and FIG. 11, a mounting plate 78 for the laser head assembly 12 is mounted securably to the carrier plate 202. The carrier plate 202 is then releasably secured to a vacuum chuck 72 that is similar to the one described above. The laser diode 20 is then secured to the carrier plate at a predetermined position along the z-axis. In blocks 112–116, the optical lenses 22,24 are then located on the mounting plate 78 aligned and adjusted to provide for rough collimation of the optical beam. Note that mounting plate 78 is not limited to planar geometry but may be of other geometries including cylindrincal. The laser diode is energized and the output power of the optical beam is measured to provide a base measurement of the output power of the laser head assembly 12. Referring to blocks 118–120, the vacuum chuck 72 then engages the precision engagement surface 74 of the common test bed 64. The optics are then aligned to provide peak output power measured by the beam detector 68. Optimization of the optics insures that the beam is propagating along the z-axis with minimal pitch and yaw, but not necessarily the optical alignment in the X and Y directions.

In block 122, the vacuum chuck 72 is then adjusted in the X and Y directions with respect to the engagement surface 74 of the common test bed 64 to obtain peak optical coupling. The output power of the beam measured at the beam detector 68 is compared to the initial output power measurement of the laser diode 20 (see block 124). If the difference of the output power of the beams is not within specification, then the steps to adjust the optics and support bed position are repeated, as shown in block 126. The alignment of the optics and vacuum chuck 72 may need to be done simultaneously depending on the particular embodiment. In block 128, when the output power is within specification, the optics of the laser head assembly 12 are soldered in place.

Figure 14:
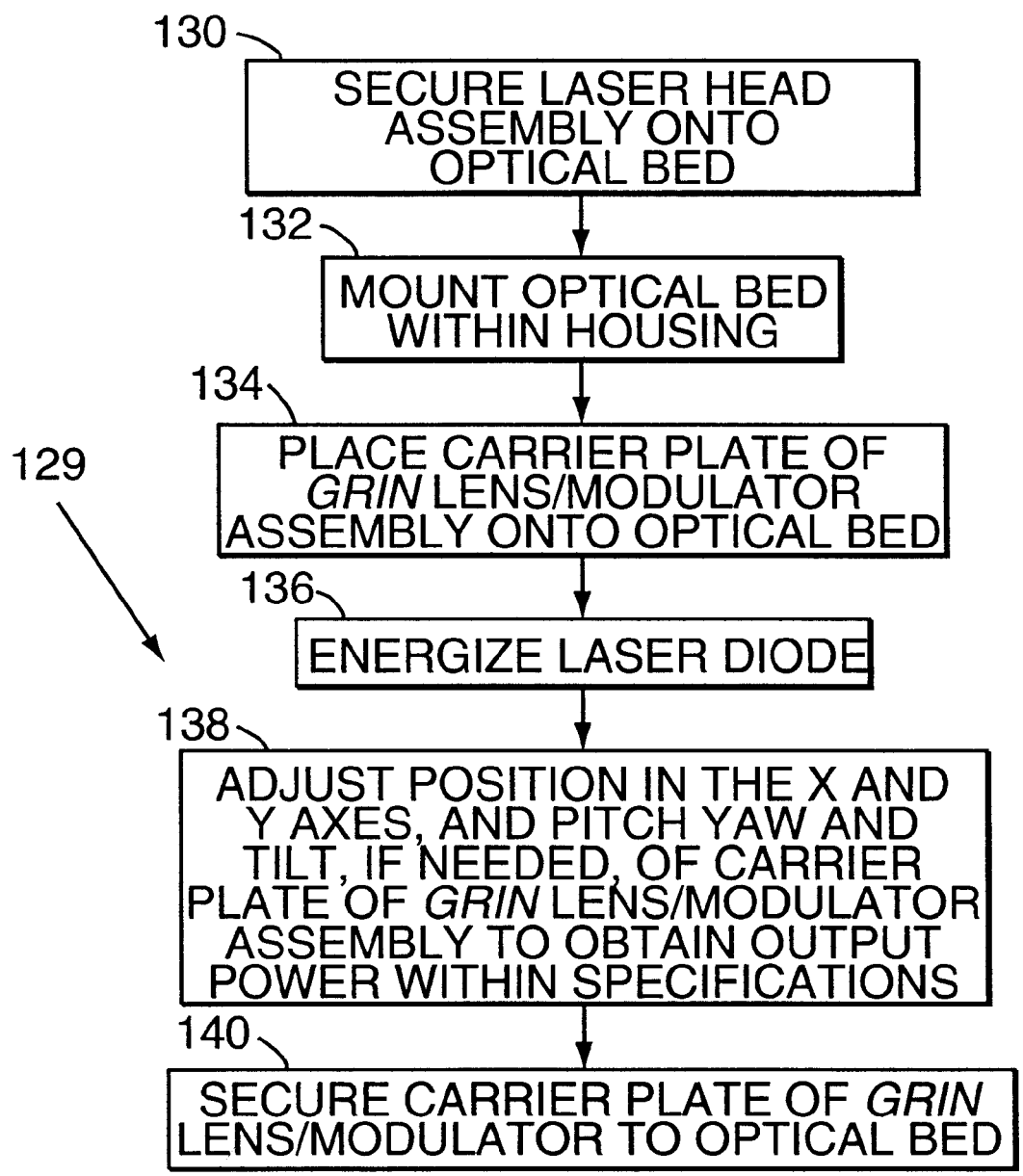
FIG. 14 is a functional diagram of a preferred general sequence of steps for fabricating the integrated optical transmitter of FIG. 6.

A method 129 of aligning the laser head assembly 12 and the GRIN lens/modulator assembly 48 to fabricate the transmitter 200 is shown in blocks 130–140 of the functional diagram of FIG. 14. Referring to block 130 and FIG. 6, the carrier plate 202 of the laser head assembly is secured fixedly to the optical bed 44 such that the optical path propagates along the z-axis. In block 132, the optical bed 44 is mounted within the transmitter housing 200. A beam detector 68 is coupled to the fiber-optic pigtail 28 that is attached to modulator 16. In block 134, the carrier plate 206 holding the GRIN lens/modulator assembly 48 is positioned onto the optical bed 44 using a vacuum chuck such that the assembly 48 is located in front of the laser head assembly 12. In blocks 136–138, the laser diode is energized, and the carrier plate with GRIN lens/modulator assembly is positioned in the X and Y axes, and pitch and yaw tilt, if needed, until the optical power at the output of modulator 16 is within specification. The carrier plate 206 is then secured fixedly to optical bed 44 to form the integrated laser modulator assembly.

An advantage of the embodiment 200 of the present invention is that the collimation of the optical beam allows for the optics components to be optically aligned and laterally-spaced on an optical bed, but not fixed together. This permits the components to move independently of each other in response to changes in ambient temperature and thereby, minimize the detrimental effects of the different coefficients of thermal expansion but still be in a fixed optical relation relative to one another. This modularization of the transmitter also permits interchangability of the optical components.

One skilled in the art would recognize that the optical modulator is not limited to a Mach-Zehnder Interferometer and that other types of modulators, e.g. Electro-Absorption (EA), can be used. The optical modulator material is not limited to lithium niobate, but includes others such as glass or polymer or others to which interface optics can be mounted, without damaging the modulator. Furthermore, even though the integrated optical transmitter is shown mounted within a housing to form a discrete module, one would recognize that a plurality of transmitters can be mounted onto a single optical bed or board.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

We claim:

1. An integrated optical transmitter for use in an optical system, comprising:
    an optical head assembly including
        an optical beam generator for providing an optical beam; and
        a lens assembly collecting said optical beam and generating therefrom a formed optical beam;
    an optical modulator for receiving said formed optical beam and for providing a modulated optical beam in response to received modulation signals; and
    interface optics adapted to receive said formed optical beam and to present the formed optical beam to said optical modulator, said interface optics providing optical coupling with said optical modulator to minimize insertion loss to the formed optical beam and to maintain a fixed relationship therewith,
    wherein said lens assembly further comprises a first aspheric lens for collecting and focusing said optical beam and a second aspheric lens for generating said collimated optical beam, said optical head assembly further including an optical isolator disposed between said first and second aspheric lenses for preventing reflected light from returning to said optical beam generator.

2. An integrated optical transmitter for use in an optical system, comprising:
    an optical head assembly including
        an optical beam generator for providing an optical beam; and
        a lens assembly collecting said optical beam and generating therefrom a formed optical beam;
    an optical modulator for receiving said formed optical beam and for providing a modulated optical beam in response to received modulation signals; and
    interface optics adapted to receive said formed optical beam and to present the formed optical beam to said optical modulator, said interface optics providing optical coupling with said optical modulator to minimize insertion loss to the formed optical beam and to maintain a fixed relationship therewith,
    wherein said interface optics comprises a graded refractive index lens which is fixedly mounted to said optical modulator.

3. An integrated optical transmitter for use in an optical system, comprising:
    an optical head assembly including
        an optical beam generator for providing an optical beam; and
        a lens assembly collecting said optical beam and generating therefrom a formed optical beam;
        an optical modulator for receiving said formed optical beam and for providing a modulated optical beam in response to received modulation signals; and
        interface optics adapted to receive said formed optical beam and to present the formed optical beam to said optical modulator, said interface optics providing optical coupling with said optical modulator to minimize insertion loss to the formed optical beam and to maintain a fixed relationship therewith, and
    a signal generator for providing said modulation signals.

4. The integrated optical transmitter of claim 3 wherein said interface optics comprises a graded refractive index lens which is fixedly mounted to said lens assembly.

5. An integrated optical transmitter for use in an optical system, comprising:
    an optical head assembly including
        an optical beam generator for providing an optical beam; and
        a lens assembly collecting said optical beam and generating therefrom a formed optical beam;
        an optical modulator for receiving said formed optical beam and for providing a modulated optical beam in response to received modulation signals; and
        interface optics adapted to receive said formed optical beam and to present the formed optical beam to said optical modulator, said interface optics providing optical coupling with said optical modulator to minimize insertion loss to the formed optical beam and to maintain a fixed relationship therewith,
    wherein said optical head assembly and said modulator are compliantly mounted to a mounting surface.

6. The integrated optical transmitter of claim 5 wherein said optical beam has a wavelength that is a function of optical beam generator current, said integrated optical transmitter further comprising a wavelength stabilization means that includes a means for sampling the optical beam generating feedback signals indicative of the wavelength of the sampled optical beam and a controller receiving said feedback signals and for generating command signals to adjust the current of the optical beam generator to provide an optical beam of a preselected wavelength.

7. The integrated optical transmitter of claim 6 further comprising a heating/cooling means in thermal communication with said mounting plate for maintaining said integrated optical transmitter at a preselected temperature.

8. The integrated optical transmitter of claim 7 wherein said heating/cooling means further comprises a thermoelectric cooler.

9. The integrated optical transmitter of claim 7 wherein said heating/cooling means is compliantly mounted to said mounting plate.

10. The integrated optical transmitter of claim 5 wherein said mounting surface further comprises an interior surface of a housing.

11. The integrated optical transmitter of claim 7 wherein said optical beam has a wavelength that is a function of optical beam generator temperature, said integrated optical transmitter further comprising a wavelength stabilization means that includes a means for sampling the optical beam generating feedback signals indicative of the wavelength of the sampled optical beam and a controller receiving said feedback signals and for generating command signals for said heating/cooling means to adjust the temperature of the optical beam generator to provide an optical beam of a preselected wavelength.

12. The integrated optical transmitter of claim 11 wherein the wavelength stabilization means further comprises a beamsplitter which provides split sampled beams to pair of optical filters before presentation to respective optical detectors and wherein said controller determines said command signals from the ratio of the signals from said optical detectors.

13. The integrated optical transmitter of claim 7 wherein said heating/cooling means is mounted to an interior surface of a housing.

14. The integrated optical transmitter of claim 7 further comprising a means for adjusting the temperature of said optical beam generator independently of said optical modulator.

15. An integrated optical transmitter for use in an optical system, comprising:

an optical head assembly including
an optical beam generator for providing an optical beam; and
a lens assembly collecting said optical beam and generating therefrom a formed optical beam;
an optical modulator for receiving said formed optical beam and for providing a modulated optical beam in response to received modulation signals; and
interface optics adapted to receive said formed optical beam and to present the formed optical beam to said optical modulator, said interface optics providing optical coupling with said optical modulator to minimize insertion loss to the formed optical beam and to maintain a fixed relationship therewith, and
a means for generating signals to energize said optical beams generator.

16. A method of fabricating an integrated optical transmitter comprising the steps of:
(a) aligning optically a laser diode and a lens;
(b) securing the laser diode and the lens to a mounting element to define a laser head assembly;
(c) securing fixedly a focusing lens to the laser head assembly in optical alignment with the laser diode and the lens;
(d) securing compliantly the laser head assembly to a substrate;
(e) securing fixedly an optical modulator to the focusing lens in optical alignment with the focusing lens and the laser head assembly to define an optical subassembly; and
(f) securing the optical subassembly to a substrate.

17. A method, as set forth in claim 16, that after step (b) includes the step of:
(a) securing a thermal transfer plug to the laser head assembly.

18. A method, as set forth in claim 16, that before step (e) includes the step of:
(a) coupling a cooling device to the optical bed.

19. A method, as set forth in claim 14, that before step (e) includes the step of:
(a) optically coupling an optical fiber to a transmitting end of the modulator.

20. A method, as set forth in claim 16, that after step (d) includes the step of:
(a) securing the substrate to a cooling device within a housing.

21. A method of fabricating an integrated optical transmitter comprising the steps of:
(a) providing an optical modulator assembly having an optical modulator with a focusing lens coupled to a first carrier plate;
(b) providing a laser head assembly having a optical beam generator and a lens coupled to a second carrier plate;
(c) securing the first carrier plate to a substrate;
(d) energizing the optical beam generator;
(e) positioning the laser head assembly on the substrate in optical alignment with the optical modulator assembly to obtain an optical beam at the transmitting end of the modulator within a predetermined level; and
(f) securing the second carrier plate to the substrate.

22. A method, as set forth in claim 21, that after step (c) includes the step of:
(a) mounting the optical transmitter within a housing.

23. A method of fabricating a modulator assembly for an integrated optical transmitter comprising the steps of:
(a) providing an optical modulator;
(b) coupling compliantly the optical modulator to a carrier plate;
(c) securing releasably the carrier plate to a vacuum chuck having an engagement surface;
(d) providing an optical beam to a transmitting end of the modulator;
(e) repeating steps j–k, if the peak output power is not within a predetermined level;
(f) adjusting the polarization of the optical beam provided to the modulator;
(g) adjusting the focusing lens to emit an optical beam of acceptable output power;
(h) providing a test assembly having a beam receiving lens mounted to a test bed having an engagement surface;
(i) abutting the engagement surface of the vacuum chuck to the engagement surface of the test bed;
(j) adjusting the focusing lens to emit from the receiving lens an optical beam of maximum output power;
(k) adjusting the position of the vacuum chuck to obtain peak optical coupling; and
(l) securing fixedly the focusing lens to the receiving end of the modulator along the optical axis.

24. A method of fabricating a laser head assembly for an integrated optical transmitter comprising the steps of:
(a) providing an optical beam generator;
(b) energizing the beam generator;
(c) measuring a first output power of the optical beam;
(d) coupling releasably a mounting plate to a vacuum chuck having an engagement surface;
(e) aligning the beam generator on the mounting plate;
(f) aligning an optical lens to roughly collimate an optical beam;
(g) providing a test assembly having a beam receiving lens mounted to a test bed having an engagement surface;
(h) abutting the engagement surface of the vacuum chuck with the engagement surface of the test bed;
(i) adjusting the beam generator and the optical lens to provide peal( output power of the optical beam emitted from the focusing lens of the test assembly;
(j) adjusting the vacuum chuck to obtain peak optical coupling;
(k) comparing peak output power of the optical beam emitted from the test assembly with the first output power of the beam generator;
(l) securing the beam generator and optical lens in place if the peak output power is within a predetermined level; and
(m) repeating steps i–k, if the peak output power is not within a predetermined level.

* * * * *

UNITED STATES PATENT AND TRADEMARK OFFICE
CERTIFICATE OF CORRECTION

PATENT NO. : 6,370,290 B1 Page 1 of 1
DATED : April 9, 2002
INVENTOR(S) : Ball et al.

It is certified that error appears in the above-identified patent and that said Letters Patent is hereby corrected as shown below:

Column 16,
Line 50, "provide peal" should read -- provide peak --

Signed and Sealed this

Second Day of July, 2002

Attest:

Attesting Officer

JAMES E. ROGAN
Director of the United States Patent and Trademark Office